(12) United States Patent
Carson et al.

(10) Patent No.: US 6,469,969 B2
(45) Date of Patent: Oct. 22, 2002

(54) INDIVIDUAL ADJUSTMENT OF PIT AND LAND TRANSITION LOCATIONS IN AN OPTICAL DISC MASTERING PROCESS

(75) Inventors: Douglass Marshall Carson, Cushing; James Maurice Colpitts, Tulsa, both of OK (US)

(73) Assignee: Doug Carson & Associates, Inc., Cushing, OK (US)

( * ) Notice: Subject to any disclaimer, the term of this patent is extended or adjusted under 35 U.S.C. 154(b) by 0 days.

(21) Appl. No.: 09/934,233

(22) Filed: Aug. 21, 2001

(65) Prior Publication Data

US 2001/0055258 A1 Dec. 27, 2001

Related U.S. Application Data

(62) Division of application No. 09/031,933, filed on Feb. 27, 1998, now abandoned.

(51) Int. Cl.[7] .................................................. G11B 7/00
(52) U.S. Cl. ................. 369/59.12; 369/47.1; 369/47.19
(58) Field of Search ............................. 369/47.19, 53.2, 369/53.33, 59.2, 47.1, 59.19

(56) References Cited

U.S. PATENT DOCUMENTS

| | | |
|---|---|---|
| 4,135,203 A | 1/1979 | Freidman |
| 4,245,321 A | 1/1981 | Gennetten |
| 4,413,323 A | 11/1983 | Muller |
| 4,783,776 A | 11/1988 | Ishigaki et al. |
| 4,796,201 A | 1/1989 | Wake |
| 4,805,116 A | 2/1989 | Liang et al. |
| 4,967,286 A | 10/1990 | Nomula et al. |
| 5,001,692 A | 3/1991 | Farla et al. |
| 5,272,687 A | 12/1993 | Matsushima |
| 5,297,129 A | 3/1994 | Wilkinson et al. |
| 5,345,434 A | 9/1994 | Ide et al. |
| 5,398,231 A | 3/1995 | Shin et al. |
| 5,416,809 A | 5/1995 | Masuda et al. |

(List continued on next page.)

FOREIGN PATENT DOCUMENTS

| | | |
|---|---|---|
| EP | 89200092.8 A1 | 1/1989 |
| GB | 2250626 A | 10/1992 |
| WO | PCT/US86/02558 | 6/1987 |

OTHER PUBLICATIONS

Seiji Kobayashi, Tsutomu Ishimoto, Kohji Fujimiya and Hisayuki Yamatsu; *Write Precompensation Technique in a Mastering Process*; pp. 296–297; Sony Corporation; Tokyo, Japan.

Primary Examiner—Nabil Hindi
(74) Attorney, Agent, or Firm—Fellers, Snider, et al.

(57) ABSTRACT

An apparatus and method are disclosed for optimizing the writing of data to an optical disc to improve readback characteristics and minimize the effects of errors. An optimization circuit generates an optimized modulation signal which is used to modulate a writing beam of a laser beam recorder, the optimized modulation signal comprising a series of data symbols that correspond to resulting pits and lands on the optical disc. The optimization circuit optimizes the locations of pit and land transitions on the optical disc by individually adjusting leading and trailing edges of the data symbols, as well as amplitudes of the data symbols. In this manner, the particular length of each pit and land on the disc can be individually selected based on nominal symbol length, as well as other factors including radial and angular locations of the pits and lands on the disc. Moreover, the selective placement of pit and land transitions can be used to embed a second set of data on the optical disc to provide watermarks or anti-piracy hidden codes. Finally, electrical jitter errors, including data correlated jitter, can further be minimized through a master driver circuit which can be used to reclock an initial modulation signal prior to generation of the optimized modulation signal by the optimization circuit.

13 Claims, 7 Drawing Sheets

U.S. PATENT DOCUMENTS

| | | |
|---|---|---|
| 5,475,672 A | 12/1995 | Le Carvennec |
| 5,498,509 A | 3/1996 | Shin et al. |
| 5,526,339 A | 6/1996 | Shimada |
| 5,557,592 A | 9/1996 | Kobayashi et al. |
| 5,559,777 A | 9/1996 | Maeda et al. |
| 5,559,785 A | 9/1996 | Honda et al. |
| 5,566,158 A | 10/1996 | Kobayashi et al. |
| 5,587,980 A | 12/1996 | Kablau et al. |
| 5,592,322 A | 1/1997 | Kim |
| 5,608,711 A | 3/1997 | Browne et al. |
| 5,608,712 A | 3/1997 | Rilum et al. |
| 5,625,614 A | 4/1997 | Taniguchi |
| 5,642,343 A | 6/1997 | Toda et al. |
| 5,654,947 A | 8/1997 | Roth et al. |
| 5,703,853 A | 12/1997 | Horigome et al. |
| 5,703,865 A | 12/1997 | Guo |
| 5,708,640 A | 1/1998 | Fukuda et al. |
| 5,712,837 A | 1/1998 | Horigome et al. |
| 5,768,235 A | 6/1998 | Huber |
| 6,088,323 A | 7/2000 | Kabayashi et al. |

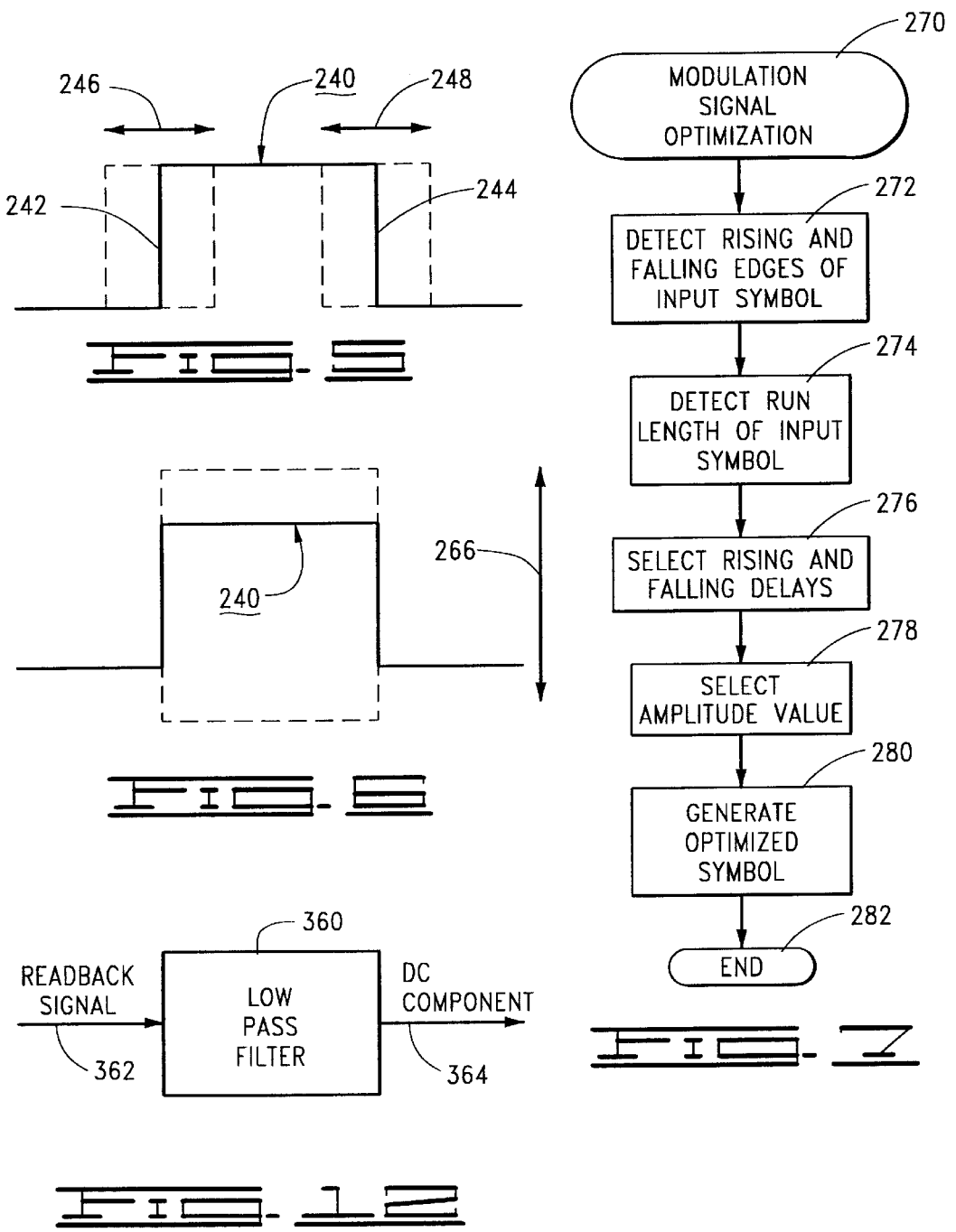

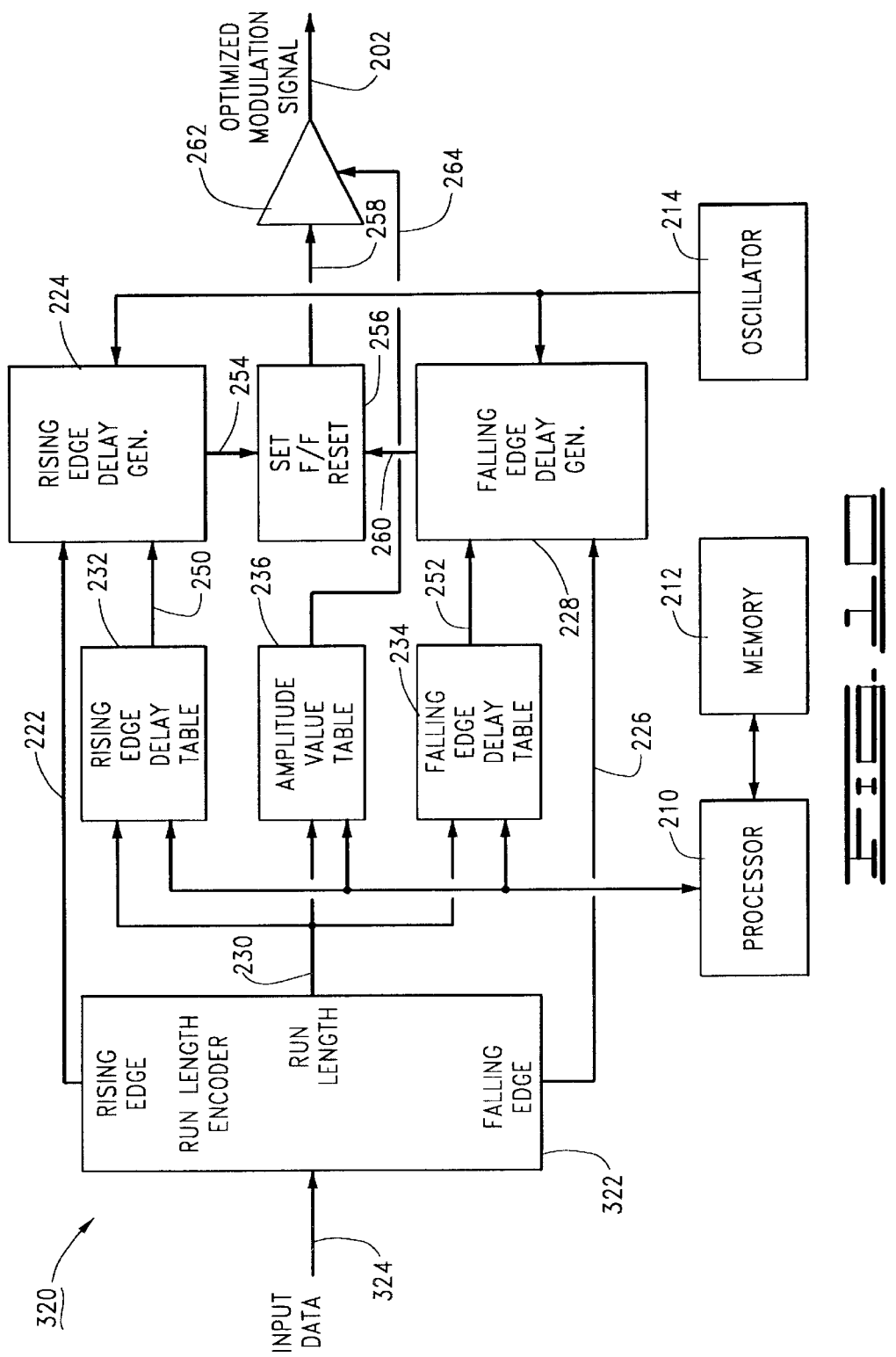

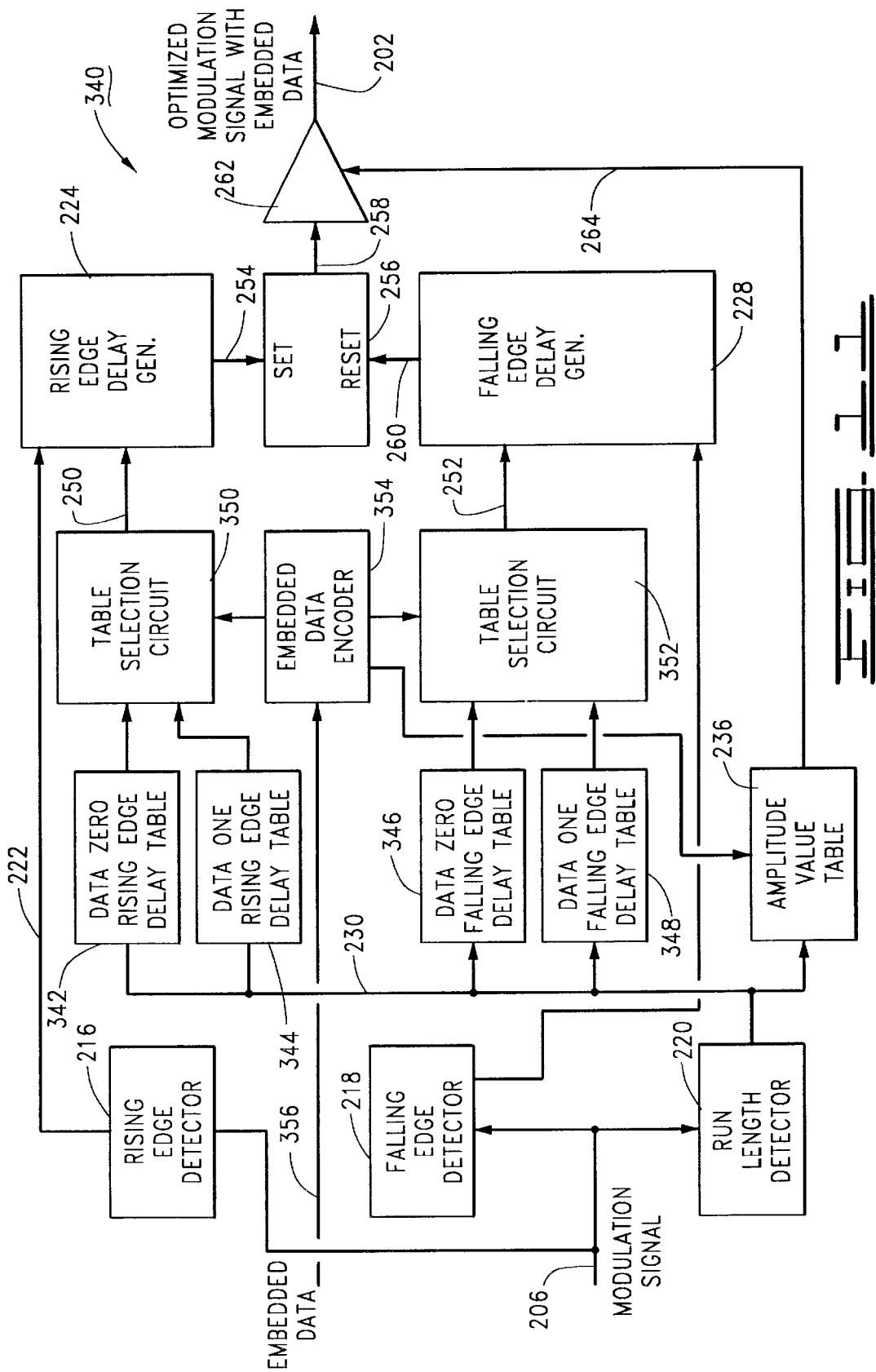

INDIVIDUAL ADJUSTMENT OF PIT AND LAND TRANSITION LOCATIONS IN AN OPTICAL DISC MASTERING PROCESS

RELATED APPLICATIONS

This application is a divisional of parent, U.S. patent application Ser. No. 09/031,993 filed Feb. 27, 1998 now abandoned.

FIELD OF THE INVENTION

The present invention relates generally to the field of optical disc data storage devices and more particularly, but without limitation, to the individual adjustment of pit and land transition locations on an optical disc to improve readback characteristics of the disc.

BACKGROUND

Optical discs have become increasingly popular as an efficient and cost-effective storage medium for digitally stored data. A typical optical disc comprises a circular disc having, a recording layer of light reflective material embedded in a refractive substrate. The recording layer is disposed along a plane substantially normal to an axis about which the disc is rotated and stores data in the form of localized pits and lands (also sometimes referred to as "marks" and "spaces") along a continuously extending spiral track. The length of each pit and land corresponds to one of a selected number of data symbols (for example, from 3T to 11T, with T of determined length).

The data symbols are recovered from the disc through the use of a light source (such as a laser) which applies light of selected wavelength to the rotating disc and a transducer which generates a readback signal indicative of the data in relation to relative differences in reflectivity of the pits and lands. More particularly, it is common to separate the relative elevations of the pits and the lands by a distance equal to a quarter-wavelength of the applied light so as to facilitate a substantial change in the amount of light reflected by the pits as compared to the amount of light reflected by the lands.

One popular optical disc format is commonly referred to as compact disc, or CD, which has found widespread use in recent years in computer applications (such as CD-ROM) and in the music recording industry (audio CDs). A CD has an outer diameter of 120 millimeters (4.724 inches) and a data storage capacity of about 600 megabytes (MB); hence, large computer software applications requiring the use of tens or even hundreds of 3 ½ inch, 1.44 MB floppy diskettes can be advantageously installed using a single CD-ROM. Moreover, a typical audio CD can accommodate about 74 minutes and 33 seconds of recorded music and provides improved sound quality through digital recording techniques; accordingly, audio CDs have essentially phased out analog recorded vinyl LP records to become the audio recording medium of choice.

Another popular optical disc format is commonly referred to as digital versatile disc, or DVD. A DVD can be considered a "high-density" CD, in that a typical DVD has generally the same dimensions as a CD, but can store about 4.7 gigabytes (GB) of data per recording layer, due to increased data storage densities through reductions in pit/land geometries and improvements in data encoding and recovery techniques. Accordingly, DVDs can be advantageously utilized as a storage medium for full-length movies (video DVD), computer storage (DVD-ROM) and music (audio DVD).

As mentioned above, data are stored by an optical disc in relation to selected symbol lengths of the pits and lands. Accordingly, reliable readback of the data requires accurate decoding of the individual lengths of the pits and lands by playback equipment (such as a CD player). Unfortunately, it will be recognized that imperfections typically arise in the mastering/replication process used generate optical discs, so that replicated optical discs ("replicas") can contain small errors that can affect the readback process. Such errors can arise during various steps of the mastering/replication process.

Various efforts have been made in the prior art in an attempt to minimize such errors, such as discussed in U.S. Pat. No. 5,608,711 issued Mar. 4, 1997 to Browne et al., and U.S. Pat. No. 5,486,827 issued Jan. 23, 1996 to Shimizume et al. However, these and other prior art references typically provide global adjustments to the process, necessitating a general trial and error approach in which an attempt is made to bring both shorter and longer pits and lands into acceptable tolerances.

Accordingly, there is a continual need for improvements in the art whereby various errors associated with optical disc mastering/replication processes can be minimized, in order to enhance optical disc quality and manufacturability.

SUMMARY OF THE INVENTION

The present invention is directed to an apparatus and method for minimizing errors associated with the writing of data to an optical disc.

In accordance with presently preferred embodiments, an optimization circuit is provided to generate an optimized modulation signal which is used to modulate a writing beam of a laser beam recorder.

The optimized modulation signal comprises a series of data symbols which correspond to resulting pits and lands on the optical disc. The optimization circuit optimizes the locations of pit and land transitions on the optical disc, and hence the lengths of the pits and lands, by individually adjusting leading and trailing edges of the data symbols, as well as amplitudes of the data symbols, in the optimized modulation signal. More particularly, the optimization circuit utilizes delay tables which provide delays of selected duration in relation to nominal lengths of the symbols. In this manner, the particular length of each pit and land on the disc can be individually selected based on nominal symbol length, as well as other factors, including radial and angular locations of the pits and lands on the disc. Moreover, the selective placement of pit and land transitions can be further used to embed a second set of data on the optical disc through the use of pairs of tables having delay values that vary by a selected amount. More particularly, the relative lengths of the pits or lands in a particular area can be adjusted sufficiently to be visibly differentiable (watermarks), while still storing the primary data written to the disc. Likewise, slight differences in the relative lengths of pits and lands over portions of the disc, such as one nanosecond or less, can be advantageously used to provide "hidden" data for anti-piracy purposes and the like. In both cases, the second set of data is recorded independent of, and hence does not interfere with the readback of, the primary data.

Finally, electrical jitter errors, including data correlated jitter, can further be minimized through a master driver circuit which can be used to reclock an initial modulation signal prior to generation of the optimized modulation signal by the optimization circuit.

It is therefore an object of the present invention to compensate for errors associated with an optical disc mastering/replication process.

Another object is allow the individual selection of pit and land lengths on an optical disc.

Yet another object is to facilitate the embedding of secondary data on a recording surface independently of the primary data recorded on the surface, to enable the use of watermarks or hidden codes.

Still another object is to eliminate the effects of data correlated jitter, thereby providing audio discs with superior sound quality.

Still another object is to facilitate a significant reduction in cycle times necessary to injection mold replica discs.

These and various other objects, features and advantages which characterize the present invention will be apparent from a reading of the following detailed description and a review of the associated drawings.

BRIEF DESCRIPTION OF THE DRAWING

FIG. 5 provides a representation of an individual symbol (land portion) of the modulation signal, illustrating the manner in which the optimization circuit can advantageously adjust rising and falling edges of the symbol.

FIG. 6 provides a representation of the symbol of FIG. 5, illustrating the manner in which the optimization circuit can advantageously adjust amplitude of the symbol.

FIG. 7 provides a flow chart illustrating the steps performed during a MODULATION SIGNAL OPTIMIZATION routine, in accordance with the optimization circuit of FIG. 4.

FIG. 10 is a functional block diagram of a third preferred embodiment of the present invention, comprising an integrated optimization circuit which directly generates an optimized modulation signal.

FIG. 11 is a functional block diagram of a fourth preferred embodiment of the present invention, comprising an embedded data optimization circuit that can embed a second set of data in an optimized modulation signal so as to facilitate the generation of a watermark or the writing of hidden data to a replica.

FIG. 12 illustrates the use of a low pass filter in a readback operation used to recover hidden data encoded by the circuit of FIG. 11.

DETAILED DESCRIPTION

Figure 1:
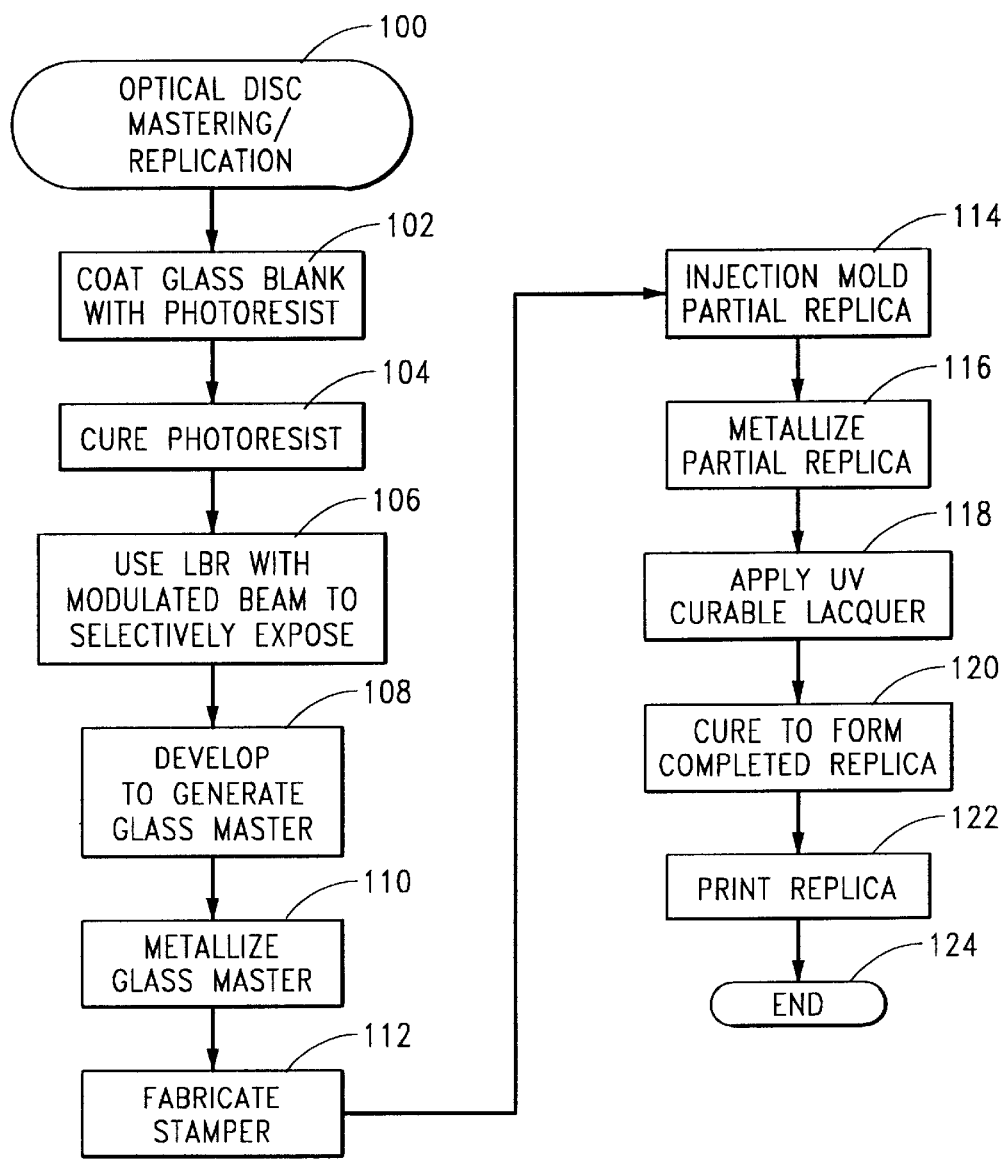
FIG. 1 provides a flow chart for an OPTICAL DISC MASTERING/REPLICATION process used to generate replicated optical discs.

In order to set forth various aspects preferred embodiments of the present invention, steps performed in a typical optical disc mastering/replication process will first be briefly discussed. Referring to FIG. 1, shown therein is a generalized flow chart for an OPTICAL DISC MASTERING/REPLICATION process 100. It will be understood that the process set forth by FIG. 1 can be performed at a single mastering and replication facility, or alternatively by different commercial entities having separate mastering and replication facilities.

The process of FIG. 1 is shown to begin at block 102 wherein a glass blank is initially coated with a thin layer of photoresist. As will be recognized, the glass blank comprises a glass disc having precise dimensions and upon which the photoresist is deposited using a spin coat or similar process. The application of the photoresist to the glass blank is highly controlled, because the thickness of the layer of photoresist largely determines the resulting elevational distance between the pits and lands on the replicated discs. In some cases, non-photoresist (NPR) comprising a nitro-cellulose or similar material can be used in lieu of photoresist.

Once deposited, the photoresist is cured, as indicated by block 104. The glass disc (with the cured photoresist) is next placed and rotated upon a turntable of a laser beam recorder (LBR), with the photoresist being selectively exposed to a modulated beam of a radially positionable laser of the LBR, as indicated by block 106. During the operation of block 106, a modulation signal is generated indicative of a desired mastering pattern which generally corresponds (either positively or negatively) to the desired pit and land configuration of the resulting replicated discs. For reference, the modulation signal is an eight-to-fourteen encoded extended frequency modulation (EFM) signal for CD mastering, and an eight-to-sixteen encoded extended frequency modulation-plus (EFM+) signal for DVD mastering, although other types of modulation signals, including multiple modulation signals, can be used as desired. The generation of modulation signals in accordance with the preferred embodiments of the present invention will be discussed in greater detail below.

Continuing with the flow of FIG. 1, the selectively exposed photoresist is developed at block 108 to generate a glass master. A chemical etching process is commonly performed to remove the exposed photoresist (or alternatively, the non-exposed photoresist). However, the operation of block 108 is typically unnecessary when NPR is utilized in lieu of photoresist, as NPR characteristically tends to vaporize when subjected to the energy associated with the modulated light beam of an LBR.

The glass master, comprising the glass disc and the cured photoresist material, is next metallized at block 110 through the deposition of a thin, conductive layer on the side having the photoresist material. Typically employed metallization techniques include vacuum deposition, sputtering and electroless nickel deposition. The metallization of the glass master facilitates the subsequent fabrication of a stamper therefrom, as indicated at block 112.

More particularly, the operation of block 112 generally comprises introducing the metallized glass master to a galvanic bath in order to grow a corresponding matrix having pit and land geometries inverse of those of the metallized glass master. When the matrix is to be used as a stamper, it is subsequently punched to form inner and outer diameter (ID and OD) dimensions and back sanded to a specified surface roughness. Correspondingly, the matrix can be used to grow a mother, in which case the matrix is chemically treated and then reintroduced to the galvanic bath to grow an inverse mother, from which subsequent stampers can be formed. This is sometimes referred to as the family process, and advantageously facilitates generation of multiple stampers for relatively long production runs, as the initial metallized glass master can typically be used to only form a single matrix.

Once the desired stamper has been obtained from block 112, the process continues to block 114, wherein the stamper is utilized in an injection mold process to form a partial replica. More particularly, the stamper is installed so as to form one wall of a mold into which molten refractive material, such as polycarbonate, is injected at high temperature and pressure. The material is typically injected from the center (i.e., from the ID of the stamper) and flows outwardly. Heating and cooling channels of the mold are utilized to quickly heat and then cool the material in an attempt to efficiently form each partial replica, which comprises a nominally clear plastic disc which is smooth on one side and possesses a desired pit and land configuration on the other side. Typical cycle times for the formation of each replica are on the order of four to six seconds apiece in high volume manufacturing environments.

It will be recognized that the molding process of block 114 is relatively complex and typically must be closely controlled, in that as many as 140 different parameters dealing with various temperatures, pressures and timing events affect the quality of the resulting partial replicas formed therefrom. Additional factors, such as the configurations of the stamper and the mold, can further have a significant effect upon the quality of the partial replicas.

Once formed, each partial replica is metallized, as indicated by block 116, whereby a thin layer of reflective material (such as aluminum) is applied to the pit and land side of the partial replica. Once metallized, a material such as ultra-violet (UV) curable lacquer is applied to the reflective layer using a spin coat or similar process, block 118, after which the applied material is cured, block 120, to form a completed, sealed replica. Finally, the replica is printed using a suitable printing process such as silk screen, block 122, and the process ends at block 124.

Although the completed replicas formed from the process of FIG. 1 are intended to have pit and land geometries that accurately reflect symbol lengths indicative of the data stored thereby, errors can be introduced throughout the process of FIG. 1 that adversely affect these geometries. Various types and sources for these errors will now be discussed.

Figure 2:
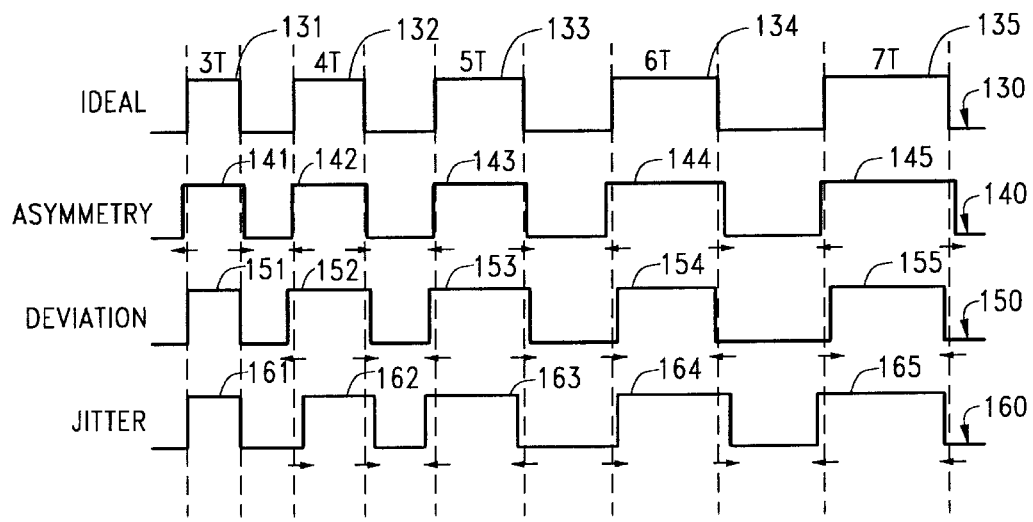
FIG. 2 provides representations of various replica topographies, illustrating various types of errors associated with the process of FIG. 1.

Referring to FIG. 2, shown at 130 is a representation of a portion of a topography of a replicated disc (not shown) having ideal symbol lengths. More particularly, the ideal topography 130 includes a series of lands 131, 132, 133, 134 and 135 having nT symbol lengths of 3T, 4T, 5T, 6T and 7T, respectively (with T a determined length). It will be readily understood that additional symbol lengths beyond those shown in FIG. 2 are typically used by optical discs (for example, CD encoding typically employs symbol lengths of from 3T to 11T) and that the aspect ratios set forth by FIG. 2 have been exaggerated for clarity. Further, though not numerically designated in FIG. 2, pits having corresponding symbol lengths are disposed between adjacent pairs of the lands 131, 132, 133, 134 and 135. It will be recognized that a nominal duty cycle of 50% is generally achieved by an ideal topography such as set forth at 130; that is, the sum total of land lengths is nominally equal to 50% of the sum total of land lengths and pit lengths.

It is desirable to provide replicas having topographies such as represented by 130 so that the data stored thereby can be accurately and reliably decoded during a readback operation. However, errors can be introduced at various stages of the mastering/replication process of FIG. 1, so that pit and land transitions fall at locations different from the ideal transition locations indicated by the dotted lines bounding each of the lands 132, 134, 136, 138 and 140 of FIG. 2. Errors associated with smaller pits and lands will generally more adversely affect readback performance than errors associated with larger pits and lands and, as discussed below, attempts to globally compensate for such errors often results in a tradeoff between maintaining both the shortest and the longest symbol length pits and lands within acceptable tolerances.

One type of error commonly introduced by the process of FIG. 1 is known as asymmetry, as indicated by an asymmetric topography represented at 140 in FIG. 2. Asymmetry will be generally understood as a condition wherein one type of symbol carrier (such as the lands) are all slightly longer than the corresponding nominal symbol lengths, and the remaining type of symbol carrier (such as the pits) are all slightly shorter than the corresponding nominal symbol lengths. In other words, asymmetry results in a replica having a nominal duty cycle other than 50%. Asymmetry is illustrated in the topography 140 in FIG. 2, as each of a series of lands 141, 142, 143, 144 and 145 are slightly longer than the corresponding ideal lands 131, 132, 133, 134 and 135 of the ideal topography 130.

Asymmetry can be introduced as a result of inaccuracies during exposure of the glass master (block 106, FIG. 1) as well as during metallization of the glass master (block 108) and during stamper generation (block 110). The effects of asymmetry are well known and it is common in the prior art to apply global compensation techniques, such as the reduction of modulation signal transition thresholds during mastering, in an attempt to reduce the presence of asymmetry in the resulting replicated discs and enhance detection of shorter symbols. That is, because prior art modulation signals have pit and land transitions that are not instantaneous, but rather are somewhat sinusoidal so that the range of nT symbol lengths resemble a human eye and are often referred to as eye patterns, prior art mastering techniques have reduced the detection threshold to a lower value, such as around 40%, to make the smallest symbols (such as 3T) a little bit longer and to compensate for the asymmetry introduced by downstream processes. However, such global threshold changes tend to affect each symbol length a little bit differently, requiring a trial and error approach to arrive at an acceptable compromise.

A second type of error referred to as deviation can also be introduced by the mastering/replication process of FIG. 1, as represented by topography 150 in FIG. 2. Broadly speaking, deviation is erroneous pit and land transition placement on a somewhat random basis, arising primarily during the injection molding process of block 114 of FIG. 1. More particularly, the same size pits and lands on the surface of a stamper can generate different sized corresponding lands and pits in the partial replica in relation to both angular and radial position of the replica. Deviation is generally illustrated in the topography 150 of FIG. 2 by the variations in lengths of lands 151, 152, 153, 154 and 155.

Although the injection mold process of block 114 (FIG. 1) is highly controlled, the injected molten polycarbonate nevertheless cools at a non-uniform rate, depending upon various factors, such as radial location and relative proximity to angularly displaced mold cooling channels. Such variations in cooling rates can result in variations in pit and land geometries over the recording surface.

Deviation errors can be further introduced when the partial replicas are deformed while removed from the mold in a semi-plastic state, as the constraints of a which volume replication environment dictates minimizing the cycle time of each replica. Occasionally, such deviation errors can be visibly observed as a ghosting effect, resembling a random, nebulous watermark on the data readback surface of a replica.

A third type of error is referred to herein as electrical jitter, caused by introduction of electrical noise to various electrical signals utilized during the mastering process. Like deviation, jitter errors are often somewhat randomly distributed, as indicated by jitter topography 160 with associated lands 161, 162, 163, 164 and 165 in FIG. 2.

Jitter errors can be classified into three main categories: random jitter, specific harmonic jitter and data correlated jitter. Random jitter is generally caused by random electrical noise, which is inherent in personal computer (PC) environments typically used in to signal processing necessary to generate the modulation signal of block 106.

Specific harmonic jitter is error at a specified frequency, typically introduced by equipment associated with the signal processing operation. For example, a 37.4 kilohertz (kHz) harmonic can be introduced in a modulation signal by a cathode ray tube (CRT) monitor associated with the signal processing PC and operating at this commonly utilized frequency.

Data correlated jitter is noise in the modulation signal that is introduced by, and hence correlated to, the input data stream itself. Particularly, it has been determined that transmission of an input data stream can cause significant variations in current drawn from a PC power supply; for example, the transmission of an FFFF data word followed by a 0000 data word can cause a variation in load current sufficient to inject fluctuations in output power supply voltage. Because the same power supply provides power to a clock oscillator used to generate the modulation signal, such variations introduced by the input data stream can cause electrical jitter that is actually correlated to the data. Data correlated jitter can be particularly exasperating to an audiophile, as such jitter can insidiously degrade sound quality during readback of an audio replica, even when the audio replica otherwise exhibits characteristics that are well within specified tolerances.

Figure 3:
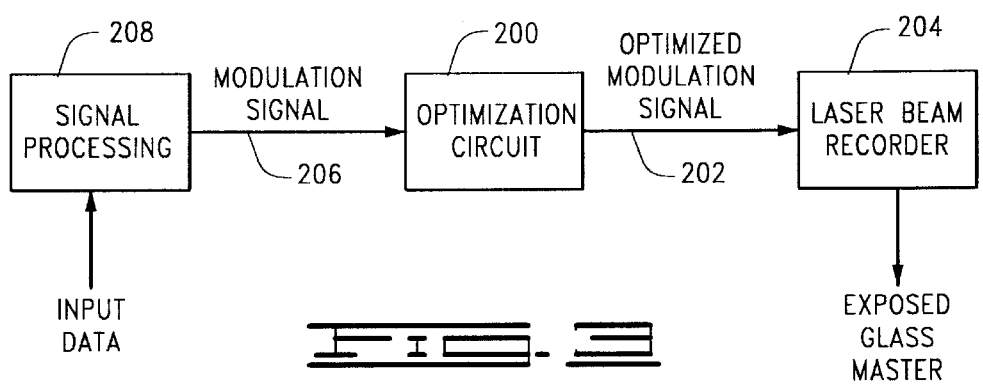
FIG. 3 is a functional block diagram of a first preferred embodiment of the present invention, including an optimization circuit used to generate an optimized modulation signal for use by a laser beam recorder during an optical disc mastering process, the optimization circuit generating the optimized modulation signal in response to a modulation signal generated by a signal processing system.

The present invention minimizes the effects of these and various other types of errors associated with the mastering/replication process of FIG. 1, by providing the capability of individually adjusting the location of each pit and land transition on the replicas generated by the process. Referring now to FIG. 3, shown therein is a functional block diagram of a first preferred embodiment of the present invention.

More particularly, FIG. 3 shows an optimization circuit 200 which generates and outputs a modified modulation signal on a signal path 202 to a conventional laser beam recorder (LBR) 204 in response to a modulation signal provided on a signal path 206 by a conventional signal processing system 208. As explained below, the optimization circuit 200 operates to optimize the input modulation signal from the path 206 so as to compensate for the various errors discussed above. The LBR 204 can be any one of several commercially available systems possessing the capability of selectively exposing a glass master through laser beam modulation, as discussed above. Moreover, the signal processing system 208 can be any of a number of commercially available systems utilized to generate a modulation signal in response to an input data stream; a particularly suitable signal processing system is the PC based MIS-6 system from Doug Carson & Associates, Inc., Cushing, Okla., USA.

Figure 4:
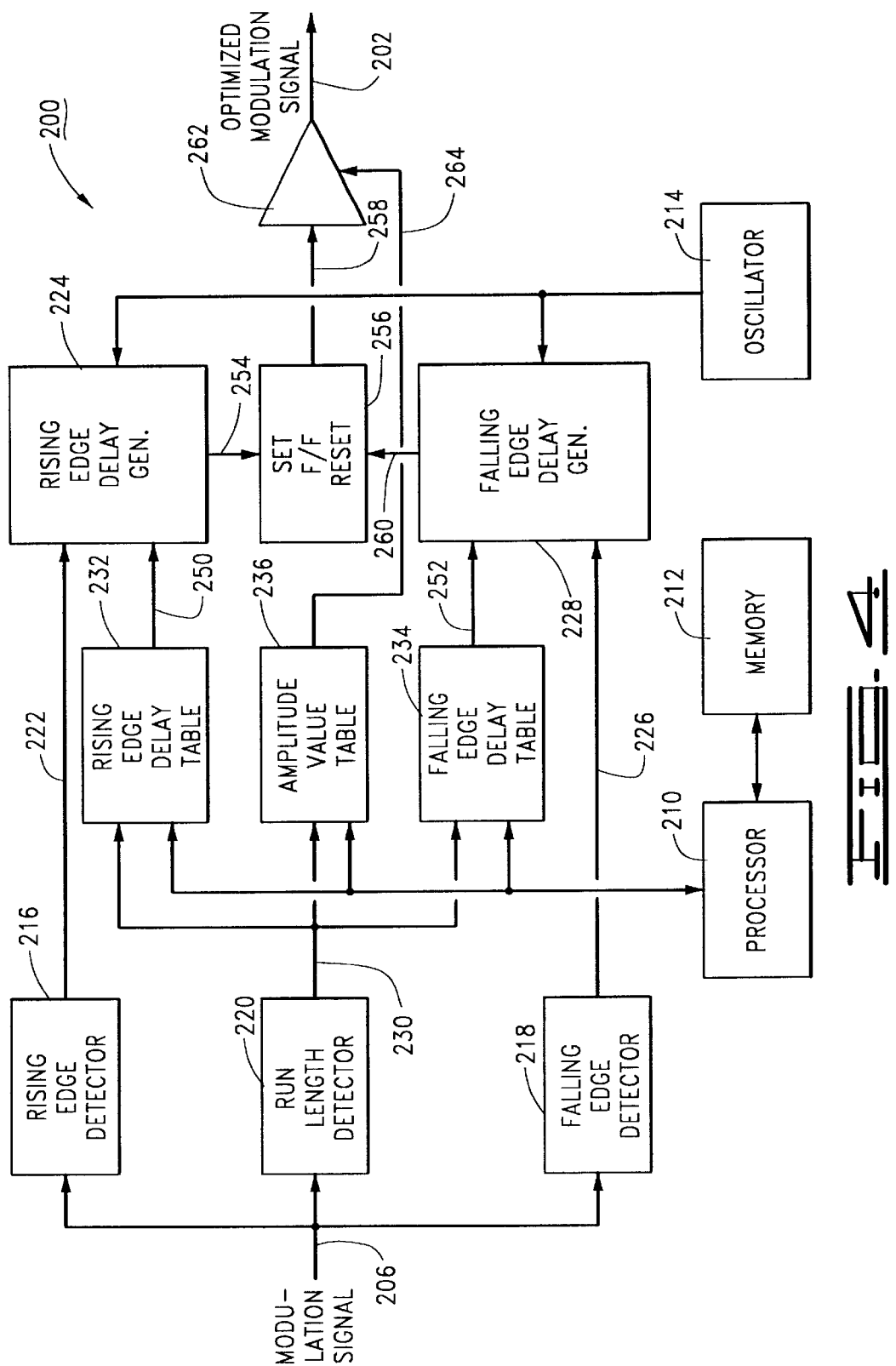
FIG. 4 is a functional block diagram showing the optimization circuit of FIG. 3 in greater detail.

Referring now to FIG. 4, shown therein is a functional block diagram of the preferred construction of the optimization circuit 200 of FIG. 3, in conjunction with various components of the signal processing system 208, including a control processor 210, associated memory 212 and a clock oscillator 214. It will be recognized that in the embodiment of FIG. 4, the optimization circuit 200 is preferably disposed within the PC environment of the signal processing system 208, providing ready access to the various components of the signal processing system shown in FIG. 4.

Initially, the modulation signal of FIG. 3 is shown in FIG. 4 to be provided to a rising edge detector 216, a falling edge detector 218 and a run length detector 220, respectively. The rising edge detector 216 operates to detect each rising edge of the modulation signal and provide an output detection signal on path 222 to a rising edge delay generator 224, the operation of which will be discussed more fully below. As will be recognized, each rising edge in the input modulation signal from path 206 generally corresponds to a pit/land boundary, such as set forth by the topographies 130, 140, 150 and 160 of FIG. 2. In like manner, the falling edge detector 218 detects each falling edge of the modulation signal (generally corresponding to each land/pit boundary as shown in FIG. 2), and outputs a detection signal on path 226 to a falling edge delay generator 228 in response thereto. A variety of constructions are available for the rising and falling edge delay generators 224, 228, so that the delays can be generated using clock signals provided by the signal processing system oscillator 214, or through non-clocked analog delay techniques.

The optimization circuit 200 individually optimizes the respective lengths and amplitudes of successively presented land (high) signal portions of the input modulation signal from path 206 (i.e., portions in the input modulation signal corresponding to the lands shown in FIG. 2); however, the optimization circuit 200 can be readily reconfigured to alternatively adjust the pit/land transitions through the detection and compensation of successive pit (low) signal portions in the modulation signal, by for example, initially inverting the modulation signal.

Continuing with FIG. 4, the run length detector 220 identifies the run length of each successively received land portion (input symbol) in the modulation signal and outputs a symbol length detection signal on path 230 to a rising edge delay table 232, a falling edge delay table 234 and an amplitude value table 236, respectively. For reference, the tables 232, 234, 236 preferably store digitally expressed values that are updated by the processor 210. Accordingly, the tables 232, 234, 236 can be implemented in hardware or software, as desired.

The rising edge delay table 232 and the falling edge delay table 234 each store a variety of delay values which are individually selected and output based upon the symbol length detection signal from the run length detector 220. Generally, the delay values allow the rising and falling edges of a given land portion of the input modulation signal to be individually adjusted over a predetermined range.

By way of illustration, FIG. 5 has been provided which shows a selected land portion 240 of the input modulation signal having nominal rising and falling edges 242 and 244, respectively. The rising and falling edges 242, 244 can each be varied over ranges indicated by arrows 246, 248 and corresponding dotted boundaries of FIG. 5 in response to the delay values of the tables 232, 234 of FIG. 4. Preferably, the delay values can be incremented over a total of 255 steps of 0.5 nanoseconds (ns) each, so that the rising and falling edges 242, 244 can each be adjusted by ±64 ns. For reference, each symbol length will be typically measured in hundreds of nanoseconds, so it will be readily understood that the ranges shown in FIG. 5 are not necessarily represented to scale.

Accordingly, the appropriate rising and falling edge delay values are output on paths 250 and 252, respectively, to the rising and falling edge delay generators 224 and 228. The rising edge delay generator 224, upon receipt of the rising edge detection signal of path 222, initiates the time delay indicated by the value received from path 222 and thereafter outputs a set signal on path 254 to a set-reset flip-flop (F/F) 256. In response, the F/F 256 asserts a high output on path 258 until such time that the F/F 256 receives a reset signal on path 260 from the falling edge generator 228. The reset signal is asserted by the falling edge generator 228 by initiating a time delay indicative of the delay value received from path 252 upon receipt of the falling edge detection signal on path 226.

Accordingly, in response to each detected land portion in the input modulation signal on path 206, the F/F 256 will output a pulse having selectively delayed rising and falling edges in accordance with the foregoing discussion. The output on path 258 is provided to a driver circuit 262, which further receives as an input an amplitude value on path 264 from the amplitude value table 236. The amplitude value controls the amplitude response of the driver circuit 262 so as to facilitate the outputting of the optimized modulation signal on path 202.

As with the tables 232, 234, the amplitude value table 236 stores a range of amplitude values which are individually selected in relation to the detected symbol length by the run length detector 220. More particularly, FIG. 6 has been provided which illustrates the manner in which the amplitude value table 236 operates to adjust the amplitude of the successively received land portions of the input modulation signal. For purposes of the present discussion, the land portion of FIG. 6 has been denoted as 240, so as to correspond to the same land portion previously discussed with reference to FIG. 5.

As shown in FIG. 6, the land portion 240 has a nominal amplitude which can be selectively varied over a range of amplitudes indicated by arrow 266 and corresponding, broken lines. Preferably, the amplitude values stored in the amplitude value table 236 facilitate adjustment of the amplitude of the high land portion 240 over a range from 0 volts to +4.3 volts (alternatively, the amplitude value table 236 can adjust low pit portions over a range from −1.0 volts to 0 volts). Such adjustments are desirable, for example, to increase the amount of energy delivered by the laser beam of the LBR 204 (FIG. 3) for relatively smaller symbol lengths, as well as to optimize the amount of energy delivered for larger symbol lengths, as desired. Moreover, the amplitude can be advantageously modulated in order to control the widths of the resulting pits and lands formed on the Lass master, such as to minimize the effects of intertrack interference (cross-talk), as well as to selectively apply human readable watermarks to the recording surfaces of the replicated discs, as discussed more fully below.

Returning to FIG. 4, additional capabilities of the circuit shown therein will now be discussed. In accordance with the foregoing discussion, it was initially stated that the tables 232, 234 can be provided with delay values that are selectively applied for each of the range of nT symbol lengths detected by the run length detector. However, the tables 232, 234 can be further supplied with delay values that are selected not only on the basis of the detected symbol length, but on additional bases as well, such as radial and angular position on the glass master (and accordingly, angular position on the resulting replicas formed therefrom).

By way of example, if the characteristics of the mold used in the injection molding process of block 114 (FIG. 1) provide non-uniform cooling characteristics (and accordingly, radially or angularly extending defect areas) due to the arrangement of heating and cooling channels, such information can be readily compiled and provided to the tables 232 so that the delays for individual pit/land transitions can be optimally selected to optimize and enhance the replication process. It is contemplated that such capabilities can further facilitate reductions in the cycle times necessary to press each replica (such as, for example, from four to six seconds down to three seconds or less), significantly improving the manufacturing throughput capabilities of a replication facility.

Referring now to FIG. 7, shown therein is a flow chart for a MODULATION SIGNAL OPTIMIZATION routine 270, representative of the operation of the optimization circuit 200 of FIG. 4 as discussed above. It will be recognized that although the circuit of FIG. 4 largely employs analog signal processing techniques, it is contemplated that in certain applications it might be desirable to generate or manipulate the signals digitally. Accordingly, it will be understood that the routine of FIG. 7 can be alternatively considered as a generalized routine representative of programming utilized by a digital processor (such as the processor 210 of FIG. 4) to carry out the modulation signal modification operations that have been previously discussed with respect to the circuit of FIG. 4.

As shown by the operation of block 272, the rising and falling edges of an input symbol are initially identified, after which the run (symbol) length for the input symbol is identified by block 274. Appropriate rising and falling edge delays are next selected, block 276, as well as an appropriate amplitude value, block 278. An optimized symbol is generated at block 280 with timing and amplitude characteristics in accordance with the values from blocks 276 and 278, after which the routine ends at block 282.

Figure 8:
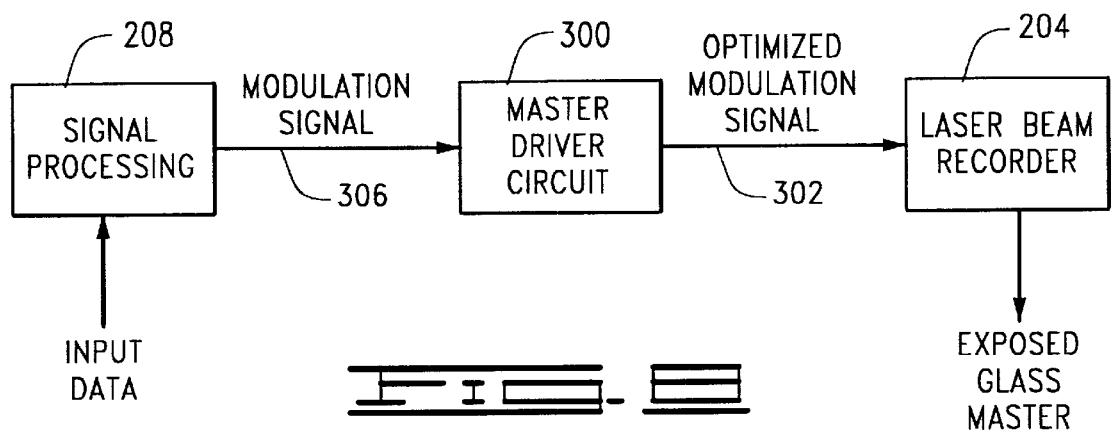
FIG. 8 is a functional block diagram of a second preferred embodiment of the present invention, including a master driver circuit which generates an optimized modulation signal for use by a laser beam recorder.

Having concluded a discussion of the first preferred embodiment set forth by FIGS. 3–7, reference is now made to FIG. 8, which provides a functional block diagram for a second preferred embodiment. For purposes of clarity of discussion, the same or similar elements that were previously identified with respect to the first preferred embodiment will be similarly identified in the alternatively preferred embodiments presented hereinbelow.

Continuing with FIG. 8, shown therein is a master driver circuit 300, which operates to generate an optimized modulation signal on a path 302 to the LBR 204 in response to an input modulation signal provided on a path 306 by the signal processing system 208. It will be noted that, unlike the optimization circuit 200 of FIGS. 3 and 4 which is preferably disposed within the environment of the signal processing system 208, the master driver circuit 300 is preferably disposed adjacent to, or even within the confines of, the LBR 204. The advantages associated with this preferred relative location for the master driver circuit 300 will become apparent below, but initially it will be noted that the relative proximity of the master driver circuit 300 to the LBR 204 is generally indicated in FIG. 8 by the relative lengths of the signal paths 302 and 306.

Figure 9:
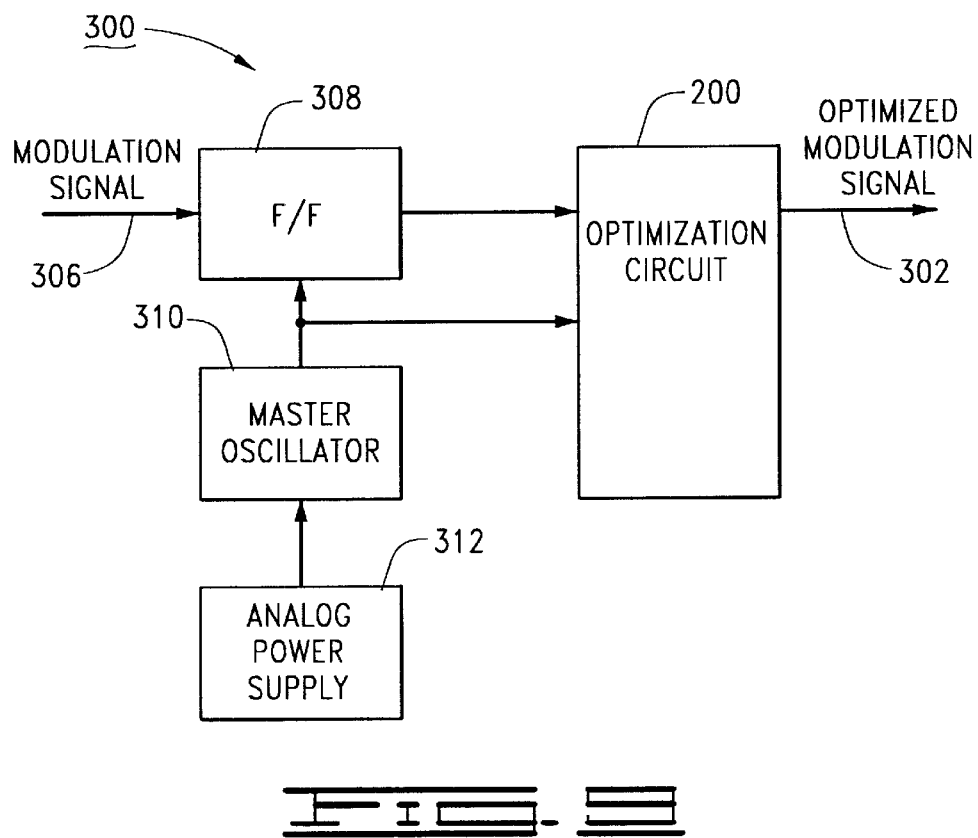
FIG. 9 provides a functional block diagram of the master driver circuit in greater detail, which preferably includes the optimization circuit of FIG. 4.

Referring to FIG. 9, shown therein is a functional block diagram of the master driver circuit 300, in accordance with a first preferred construction. The master driver circuit 300 is shown to comprise a D flip-flop (F/F) 308 which reclocks the modulation signal (from path 306) using a master oscillator 310. Although not shown in FIG. 8, it will be understood that the master oscillator 310 establishes a master clock frequency for the system of FIG. 8 and accordingly synchronizes appropriate upstream circuitry (such as the signal processing system oscillator 214 shown in FIG. 4).

The master oscillator 310 is in turn powered by an analog power supply 312, which is separate from the power supply utilized by the signal processing system 208. As will be recognized the power supply 312 is preferably of analog construction to provide a characteristically cleaner output as compared to digital power supplies which can often introduce undesirable high frequency switching components. Finally, the master driver circuit 300 of FIG. 9 is shown to further comprise the optimization circuit 200 of FIG. 4, except that the optimization circuit 200 receives the master clock frequency from the master oscillator 310 instead of being clocked by the signal processing system oscillator 214, as shown in FIG. 4.

Accordingly, the master driver circuit 300 operates to reclock the modulation signal before proving the same to the optimization circuit 200 for generation of the optimized modulation signal. In this way, errors introduced by random, frequency specific and data correlated jitter can be practically eliminated from the optimized modulation signal, facilitating the generation of superior optical disc replicas (including superior audio discs). The effects of electrical noise are further minimized by disposing the master driver circuit 300 as close as practical to the actual laser beam of the LBR 204, and preferably within the LBR itself, depending upon the application.

Although the master driver circuit 300 has been shown to preferably comprise the optimization circuit 200, it will be clearly understood that the master driver circuit 300 can be alternatively configured so as to remove such modulation signal modification capabilities. Although such a configuration substantially eliminates the various advantages presented by the modification circuit 200, this alternative embodiment for the master driver circuit 300 nevertheless provides substantial improvements in the mastering/replication process by eliminating the effects of electrically induced jitter errors, as discussed above.

It should be noted that combining the system of FIG. 3 with this alternative embodiment for the master driver circuit 300 will provide an unintentional result of removing any improvements in signal quality provided by the upstream optimization circuit 200. That is, when master clocking is to be employed with modulation signal optimization, the optimization circuit 200 should be located downstream from the master clocking operation of the master driver circuit 300 (as shown in FIG. 9), thereby preventing the master oscillator 310 from redefining previously adjusted rising and falling edges of the modulation signal.

Referring now to FIG. 10, shown therein is yet another preferred embodiment of the present invention. More particularly, FIG. 10 sets forth an integrated optimization circuit (generally denoted at 320) which, like the optimization circuit 200 of FIGS. 3–4, generates an optimized modulation signal for use by the LBR 204. However, unlike the optimization circuit 200 which utilizes a conventionally generated modulation signal to generate the optimized modulation signal, the integrated optimization circuit 320 of FIG. 10 generates the optimized modulation signal directly.

As shown in FIG. 10, the integrated optimization circuit 320 comprises a run length encoder 322, which operates to encode input data on path 324 (which may include some amount of preconditioning, depending upon the application). In response to the input data, the encoder 322 provides rising edge, falling edge and symbol run length outputs on paths 222, 226 and 230, after which the circuit of FIG. 10 generally operates in a manner similar to that of the optimization circuit 200 of FIGS. 3–4 and the flow of FIG. 7 to output the optimized modulation signal on path 202.

Referring now to FIG. 11, shown therein is another preferred embodiment of the present invention. More particularly, FIG. 11 provides a functional block diagram of an embedded data optimization circuit 340, generally similar in construction and operation to the optimization circuit 200 and the integrated optimization circuit 320 discussed hereinabove, except as will be noted in the following discussion. Generally, however, the circuit 340 operates to generate an optimized modulation signal as before, so that the timing of individual pit/land transitions and the amplitudes of individual symbols are selectively and independently controlled. Accordingly, several of the components and signal paths of previously discussed embodiments are likewise identified in FIG. 11. Although not shown in FIG. 11 for purposes of clarity, it will be understood that components of the signal processing system 208 (such as the processor 210, memory 212 and the oscillator 214 of FIG. 4) are preferably utilized in similar fashion by the circuit 340 of FIG. 11.

However, the circuit 340 of FIG. 11 provides an additional capability of embedding a second, separate set of data in the glass master (and hence, the resulting replicated discs) which is independent from the first, primary set of data recorded by the LBR 204. As explained below, this data can be embedded in a "coarse" fashion so as to generate human readable watermarks on the recording surfaces of the replicated discs, or can be embedded in a "hidden" fashion so as to generate hidden codes that can enhance anti-piracy and similar efforts. In each case, the embedded data do not otherwise affect the readback characteristics of the replicated discs.

The manner in which the circuit 340 advantageously embeds the second set of data will now be discussed. Initially, as shown in FIG. 11, two pairs of tables 342, 344 and 346, 348, respectively, are separately provided to selectively generate the delays applied to the rising and falling edges of the modified symbols output by the circuit 340. More particularly, the tables 342 and 344 are identified as "data zero" and "data one" rising edge delay tables, respectively, and the tables 346 and 348 are identified as "data zero" and "data one" falling edge delay tables, respectively.

Preferably, the delay values stored in the rising edge tables 342 and 344 and in the falling edge tables 346 and 348 are initially selected (and provided, for example, by the processor 210 of FIG. 4) in view of the previously discussed considerations so as to compensate for a variety of different symbol lengths, as well as radial and angular positions on the master disc (and resulting replicas).

However, beginning with the rising edge delay values for the rising edge tables 342 and 344, once nominal delay values have been selected, these nominal values are preferably "decremented" by a uniformly selected amount to generate "data zero" delay values, which are then stored in the data zero rising edge delay table 342. Similarly, the nominal delay values are further "incremented" by the same amount to generate "data one" delay values which are stored in the data one rising edge delay table 344. In like fashion, "data zero" and "data one" falling edge delay values are generated and stored in the data zero falling edge delay table 346 and the data one falling edge delay table 348. In an alternative embodiment, the data zero delay tables 342 and 346 store the nominal delay values and the data one delay tables 344 and 348 receive delay values that have either been incremented or decremented, as desired, by a selected amount. The amounts by which the delay values stored in the delay tables 342, 344, 346 and 348 are differentiated are selected in relation to the manner in which the embedded data is to be used; for example, when a human readable watermark is desired, the selected amounts can be several nanoseconds (i.e., several, or even several tens of steps). Conversely, hidden codes can be successfully embedded and recovered with the use of a selected differential delay as low as a single nanosecond; that is, the circuit 340 can advantageously encode hidden data by differentially adjusting, by one nanosecond, pit and land transitions of symbols having lengths extending thousands of nanoseconds.

At this point, however, it can be seen from FIG. 11 that the rising edge delay tables 342, 344 are connected to a table selection circuit 350 and that the falling edge delay tables 346, 348 are likewise connected to a table selection circuit 352. The table selection circuits 350, 352 are in turn operably coupled to and controlled by inputs provided by an embedded data encoder 354, which in turn receives the second set of data to be embedded along embedded data path 356.

During operation, remaining portions of the circuit 340 operates as discussed before to detect rising and falling edges, as well as run lengths, of successively presented land portions (symbols) of the modulation signal from path 206. Such operation includes the individual selection of rising and falling delay values by the respective delay tables 342, 344, 346 and 348 and the outputting of the same to the respective table selection circuits 350, 352. In the absence of the provision of embedded data along path 356, the embedded data encoder 354 defaults the connection of a selected rising and a selected falling table (such as, for example, the data zero rising edge delay table 342 to facilitate nominal delay timing of the rising edges and the data zero falling edge delay table 346 to facilitate nominal delay timing of the falling edges).

However, at such time that data are presented to the embedded data encoder 354 by way of path 356, the embedded data encoder selectively connects the various delay tables 342, 344 and 346, 348 in response to the presented data, thereby introducing nominal variations in the optimized modulation signal indicative of the embedded data. When a watermark is to be applied to the recording surface, the data indicates the radial and angular locations of the symbols to which the differential encoding to be applied and the embedded data encoder 354 operates to apply the appropriate values from the delay tables 342, 344, 346 and 348. Accordingly, those symbols in the area of the watermark will all have a slightly different (e.g., longer) symbol length than remaining portions of the recording surface and will be distinguishable to the human eye.

Alternatively, when hidden data are to be encoded, the embedded data encoder selectively applies the differential encoding in relation to the hidden data. Preferably, the duration of each bit of the hidden data will depend upon the selective amount used to differentiate the values between the data zero and the data one tables (342, 344 and 346, 348). Generally, the smaller the selective amount, the longer the duration of time that will be necessary to write each bit of the hidden data (for example, using a differential amount of one nanosecond might require each bit of hidden data being written over several milliseconds). As previously indicated, the embedding of either watermarks or hidden data using the circuit 340 of FIG. 11 results in no significant degradation in readback quality of the primary data encoded using the optimized modulation signal. It will be understood that the embedded data encoder 354 can further vary the selection of amplitude values from the amplitude value table 236, to enhance the embedding of the second set of data.

The manner in which previously encoded hidden data are subsequently decoded from a replica during a readback operation will now be discussed with reference to FIG. 12. As shown in FIG. 12, a low pass filter 360 is provided to filter a conventional readback signal provided on path 362, the readback signal obtained during normal readback of the replica. As will be recognized, the operation of the low pass filter 360 will be to substantially remove higher frequency components from the readback signal, resulting in an output signal on path 364 indicative of the direct current (DC) component of the signal. Accordingly, monitoring the DC component obtained from a series of data symbols from the replica in which hidden data have been embedded will provide an indication of the embedded data, in that the "data zero" bits will have a different relative DC component than the "data one" bits. With previous knowledge of the location and timing of the various embedded hidden data bits, the same can be readily recovered using the low pass filter. Conversely, without such knowledge, the detection (and unauthorized duplication) of the embedded data will generally be difficult to accomplish.

Accordingly, the present invention provides several important advantages over the prior art, by providing the capability of optimizing individual pit and land transitions of a master, and hence, replicated optical discs. Various errors inherent in modern optical disc mastering/replication processes, including asymmetry, deviation and jitter can be readily controlled or minimized. Moreover, a separate set of data can be readily embedded in a master disc, facilitating the use of human readable watermarks or hidden data through differential symbol lengths.

In view of the foregoing discussion, it will now be clear that the present invention is directed to a method and apparatus for optimizing the writing of data to an optical disc to improve readback characteristics and minimize the effects of errors.

An optimization circuit (such as 200, 320, 340) generates an optimized modulation signal (such as along path 202, 302) which is used to modulate a writing beam of a laser beam recorder (such as 204). The optimized modulation signal comprises a series of data symbols (such as 240) that correspond to resulting pits and lands on the optical disc (such as shown at 130, 140, 150, 160). The optimization circuit optimizes the locations of pit and land transitions on the optical disc by individually adjusting leading and trailing edges of the data symbols (such as by 276, 280) as well as amplitudes of the data symbols (such as by 278, 280).

In this manner, the particular length of each pit and land on the disc can be individually selected based on nominal symbol length, as well as other factors including radial and angular locations of the pits and lands on the disc. Moreover, the selective placement of pit and land transitions can be used to embed a second set of data (such as on path 356) on the optical disc to provide watermarks or anti-piracy hidden codes. Finally, electrical jitter errors, including data correlated jitter, can further be minimized through a master driver circuit (such as 300) which can be used to reclock an initial modulation signal prior to generation of the optimized modulation signal by the optimization circuit.

For purposes of the appended claims, the phrase "optical disc" will be understood in accordance with the foregoing discussion to describe a disc on which data are optically stored, such as with the glass masters and replicated optical discs discussed above, as well as other types of discs such as magneto-optical discs and the like. Moreover, the use of the term "circuit" will be understood to cover both hardware and software based implementations.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. In a method for writing data to an optical disc wherein a first set of data having a desired informational content is modulated to provide a corresponding series of data symbols, each data symbol having a leading edge, a trailing edge and a nominal symbol length corresponding to a population of preselected symbol lengths, and wherein relative timing of at least selected ones of the leading and trailing edges are adjusted to improve optical disc readback characteristics, the improvement characterized as the method further comprising steps of:

(a) providing a second set of data; and
   (b) further adjusting at least selected ones of the leading edges or trailing edges of the data symbols to embed the second set of data upon the series of data symbols so that the informational content of the first set of data is stored in relation to lengths of pits and lands on the optical disc and the informational content of the second set of data is stored in relation to variations of the lengths of the pits and lands, wherein the second set of data provides hidden codes associated with the optical disc which are substantially undetectable to a human upon visual inspection of the optical disc.

2. The method of claim 1, wherein the second set of data comprises anti-piracy information to prevent unauthorized duplication of the optical disc.

3. The improvement of claim 1, wherein the second set of data is subsequently retrieved from the optical disc comprising steps of:

(c) transducing the data symbols written to the optical disc during step (b) to generate a readback signal;
   (d) passing the readback signal through a low pass filter to generate a filtered readback signal; and
   (e) detecting the second set of data in relation to the relative magnitudes of the filtered readback signal.

4. The improvement of claim 1, wherein the optical disc comprises a master disc from which replicated optical discs can be subsequently formed.

5. An optical disc having data written in accordance with the improved method of claim 1.

6. An optimization circuit which generates an optimized modulation signal for writing data to an optical disc, the data comprising a first set of data expressed as a series of data symbols each having a leading edge, a trailing edge and a length corresponding to one of a set of associated nominal symbol lengths, the optimization circuit comprising:

a first leading edge delay table which provides first leading edge delay values each indicative of an associated leading edge delay for at least selected leading edges of the data symbols;

a second leading edge delay table which provides second leading edge delay values which correspond to and which vary by a selected amount from the first leading edge delay values;

a first trailing edge delay table which provides first trailing edge delay values each indicative of an associated trailing edge delay for at least selected trailing edges of the data symbols;

a second trailing edge delay table which provides second trailing edge delay values which correspond to and which vary by a selected amount from the first leading edge delay values; and an embedded data encoder circuit which selectively applies the first and second leading edge delay values and the first and second trailing edge delay values to the series of data symbols to selectively embed a second set of data onto the first set of data to generate the optimized modulation signal, the second set of data having a separate informational content apart from the informational content of the first set of data so that the informational content of the first set of data is stored in relation to lengths of pits and lands on the optical disc and the informational content of the second set of data is stored in relation to variations of the lengths of the pits and lands, wherein the second set of data provides hidden codes associated with the optical disc which are substantially undetectable to a human upon visual inspection of the optical disc.

7. The optimization circuit of claim 6, wherein the second set of data comprises anti-piracy information to prevent unauthorized duplication of the optical disc.

8. The optimization circuit of claim 6, wherein the optical disc comprises a master disc from which replicated optical discs can be subsequently formed.

9. An optical disc having data written using the optimization circuit of claim 6.

10. The optimization circuit of claim 6, in combination with a signal processing circuit which generates an initial modulation signal from the first set of data and a master driver circuit connected between the signal processing circuit and the optimization circuit, wherein the master driver circuit reclocks the initial modulation signal to provide a reclocked modulation signal to the optimization circuit, wherein the optimization circuit generates the optimized modulation signal in response to the reclocked modulation signal, and wherein the master driver circuit includes an analog power supply decoupled from a power supply of the signal processing circuit to reduce introduction of electronic jitter noise from the power supply of the signal processing circuit.

11. A system for writing data to an optical disc, comprising:

a signal processing circuit which generates an initial modulation signal by modulating a set of data to form a series of data symbols, each data symbol having a leading edge, a trailing edge and a nominal symbol length corresponding to a population of preselected symbol lengths, the signal processing circuit including a first power supply to provide electrical power to remaining portions of the signal processing circuit;

a master driver circuit operably coupled to the signal processing circuit to receive and reclock the initial modulation signal to provide a reclocked modulation signal, the master driver circuit comprising:

a latch configured to receive and temporarily store successive portions of the initial modulation signal;

a master oscillator, coupled to the latch, which generates and supplies a master clock at a selected frequency to reclock the modulation signal at the selected frequency of the master clock; and an analog power supply which uses a transformer to rectify alternating current (ac) electrical power to provide direct current (dc) electrical power for use by the master oscillator and the latch, the analog power supply electrically and mechanically isolated from the first power supply of the signal processing circuit; and an optimization circuit, coupled to the master driver circuit, which generates an optimized modulation signal for modulating the writing of the data to the optical disc by selectively adjusting at least selected leading and trailing edges of the series of data symbols to improve optical disc readback characteristics.

12. The system of claim 11, wherein the set of data is characterized as a first set of data, and wherein the optimization circuit further adjusts at least selected leading and trailing edges of the series of data symbols to embed a second set of data onto the first set of data so that an informational content of the first set of data is stored in relation to lengths of pits and lands on the optical disc and the informational content of the second set of data is stored in relation to variations of the lengths of the pits and lands, wherein the second set of data provides hidden codes associated with the optical disc which are substantially undetectable to a human upon visual inspection of the optical disc.

13. The system of claim 12, wherein the second set of data comprises anti-piracy information to prevent unauthorized duplication of the optical disc.

* * * * *